United States Patent Office 2,966,426
Patented Dec. 27, 1960

2,966,426
PROCESS FOR THE PRODUCTION OF BORON PHOSPHIDE

Forrest V. Williams and Robert A. Ruehrwein, Dayton, Ohio, assignors to Monsanto Chemical Company, St. Louis, Mo., a corporation of Delaware No Drawing. Filed Mar. 3, 1958, Ser. No. 718,463

6 Claims. (Cl. 117—106)

The present invention relates to a new method for the production of boron phosphide as a crystalline composition of matter.

It is an object of this invention to provide boron phosphide, BP, in the form of a well-crystallized, hard, thermally stable and chemically inert material. It is a further object to provide a highly abrasive, chemically inert form of boron phosphide which may be prepared in the form of granular crystalline particles suitable for use as an abrasive material. It is a still further object of this invention to provide a process by which shaped structures such as refractory articles, chemical apparatus, turbine blades and combustion fittings such as combusion chambers and nozzles may be prepared from crystalline boron phosphide.

Further objects and advantages of the invention will be apparent from the following description.

The crystalline form of boron phosphide is prepared by a reaction in the gaseous phase at elevated temperatures between a boron compound selected from the group consisting of boron halides, hydrides and alkyls with phosphorus halides or hydrides. Examples of gaseous boron compounds include the boron halides, e.g., boron trichloride, boron tribromide and boron triiodide; as well as other boron halides and mixed halides; alkyl boron compounds such as methyl boron, ethyl boron, propyl boron, ispropyl boron, and tert.-butyl boron, ethyl alkylated pentaborane and ethyl alkylated decaborane; boron hydrides including diborane pentaborane and decaborane. The reactants contemplated in the present invention are phosphorus and boron compounds which exist in the gas phase at reaction conditions.

The temperature of reaction between the boron halide such as boron trichloride or boron tribromide and phosphine will generally be above about 1,100° F. and may by as high as 3,600° F. or even higher. A preferred range is from 1,600° F. to 2,700° F. The time required for the reaction is dependent upon the temperature and the degree of mixing of the reactants.

The proportions of the phosphorus source and the boron source should be substantially equiatomic, although an excess of either component may be utilized if desired, or as a control method in modifying physical properties such as the density of the product.

When carrying out the present process it has been found convenient to make use of a high temperature furnace, such as a resistance furnace in which a separate jet of a boron halide, for example, boron trichloride is contacted with a separately introduced jet of phosphine. It is desirable that the two streams undergo turbulent mixing in order to assure completion of the reaction with the formation of the cubic crystalline form of boron phosphide. The reaction rate is extremely rapid.

The crystalline boron phosphide may be prepared entirely in the gas stream. However, it is usually more efficient to form the cubic crystalline boron phosphide on a surface such as a prototype form which is to be coated with the crystalline product. However, it is also contemplated that the boron phosphide be collected on the walls of a collecting chamber. It is found that the product is readily removed from the walls of the collecting chamber as a coherent material which may be further crushed if desired. The yield of boron phosphide obtained by the above methods is quite high and approaches quantitative yields.

Boron phosphide as herein prepared is a highly crystalline material with a cubic crystalline structure having a unit cell length of about 4.537 Angstrom units. Its hardness lies between 8 and 9 on Moh's scale (diamond=10). It is, however, not as hard as silicon carbide, but it has been found that it will scratch and abrade quartz, porcelain, agate, cemented tungsten carbide and possibly sapphire. The crystalline material is quite light, having a particle density by the pycnometer method of 2.94 (theoretical, 2.97).

The crystalline form of boron phosphide is resistant to oxidation when exposed for two minutes to an oxy-hydrogen flame giving a temperature of 4,000° F. In addition it has been found that a sample at this temperature can be subjected to an oxygen jet from a cutting torch without appreciable deterioration of the crystalline boron phosphide.

While this material is somewhat less resistant to oxidation while it is being heated up to such high temperatures, the provision of a neutral or reducing atmosphere overcomes any such tendency towards deterioration. When exposed to a flame at 2,100° F. in air, it will not burn. A thin coating apparently forms on the exposed surface, which coating protects the boron phosphide at these high temperatures. The melting point of this material is extremely high, but from theoretical considerations and by analogy with data on similar compounds, it should melt at a temperature greater than about 5,400° F.

Cubic crystalline boron phosphide is not attacked by any liquid reagent which has been tried. It is completely stable to boiling nitric acid and to boiling aqua regia.

The following examples illustrate specific embodiments of the present invention.

Example 1

A resistance-type electric furnace was provided with a quartz tube having two separate inlet tubes for the admission of boron trichloride and phosphine. The quartz tube was maintained at a temperature of about 1,800° F. Under these conditions it was found that a chemical reaction occurred between the two gaseous reactants with the production of a dark-reflecting-like material in the top portion of the tube. At the conclusion of the run the product was removed and was identified as the cubic form of boron phosphide by X-ray diffraction analysis.

Example 2

The formation of a curved object of crystalline boron phosphide was carried out by employing a curved sheet of molybdenum as the form on which the crystalline material was to be deposited. In this experiment a resistance-type electric furnace having a quartz tube was employed to hold the molybdenum form. A stream of a 50 vol. percent mixture of boron trichloride with 50 vol. percent phosphine was admitted to the tube with the molybdenum form being maintained at a temperature of about 1,800° F. It was found that the gaseous reactants underwent a chemical reaction with the formation of crystalline boron phosphide on the molybdenum form. After a sufficiently thick layer of boron phosphide had thus been obtained, the furnace was cooled and the molybdenum form with its coating of boron phosphide was removed from the furnace. It was found that the boron phosphide existed in a crystalline modification which could readily be removed as a unit from the form.

*Example 3*

The formation of a venturi throat for a rocket was carried out by utilizing a graphite prototype of the desired form. This form was placed in a quartz tube located in an induction electric furnace which could be heated to a temperature of 2,000° F. Separate streams of boron trichloride and phosphine were admitted to the quartz tube. The graphite form which was located in the hottest part of the furnace was found to provide a reaction surface on which the decomposition of boron trichloride and phosphine progressed rapidly with the consequent transformation to crystalline boron phosphide as a coating on the graphite throat. The coating process was continued until a deposition of about 9/1000 inch thickness was obtained. The sample was then removed from the furnace and was found to have a smooth, hard coating of crystalline boron phosphide.

*Example 4*

A fuel tank for a rocket is fabricated from stainless steel and is provided with relatively large inlet and outlet openings in one end of the cylindrical body. The steel form is placed in an electric furnace and raised to a temperature of about 1,200° C. A jet of boron trichloride is introduced into one of the openings of the vessel, while a jet of phosphine is introduced into another opening. The two gas streams are caused to comingle with turbulence. It is found that a chemical reaction occurs with the deposition of boron phosphide as a lining which covers the stainless steel to provide a corrosion-resistant layer which withstands the attack of fuming nitric acid.

The cubic crystalline form of boron phosphide is characterized by unusually high temperature stability. It has been found that this material may be subjected to for brief periods temperatures of about 6,000° F. This material is also resistant to attack by any known liquid chemical reagents, including the mineral acids, for example, sulfuric acid, hydrochloric acid and fuming nitric acid, as well as basic materials such as caustic and hydrazine. Aqua regia does not attack the crystalline form of boron phosphide and an oxy-hydrogen flame directed intermittently against the crystalline product does not cause any appreciable oxidation.

The inert character of crystalline boron phosphide as well as its high temperature stability, makes this a useful material in the fabrication of rocket and jet fittings and hardware. Examples of some of the parts which can thus be fabricated from crystalline boron phosphide include corrosion-resistant combustion chambers and liners for various vessels, including fuel tanks which are to be used to store both liquid and solid propellant fuels and oxidants, including ammonium perchlorate, fuming nitric acid and alkyl boron compounds, such as ethyl alkylated pentaborane and ethyl alkylated decaborane. Missile elements which must withstand extreme abrasion and high temperature shock may also be manufactured from crystalline boron phosphide; examples of such fittings include nose cones and rocket nozzles. Other hardware items which must withstand the abrasion of high temperature gas streams and are therefore preferably made from crystalline boron phosphide include jet elevators (also called jetevators) and other jet vanes, elevators and control surfaces. It is an advantage of the present invention that curved shapes may readily be manufactured in a form which is characterized by high strength. The formation of the crystalline modification of boron phosphide results in the production of a gross structure of the particles to provide interlocking of the crystallites. This is particularly advantageous in the fabrication of curved shapes since the interlocking of the crystallites results in the production of a smooth curved surface. This effect is advantageous in the fabrication of parts which must undergo great thermal stress and shock, for example, in the nose cones of rockets and missiles. The present type crystalline boron phosphide has also been found to be stable to combustion gases without appreciable attack on the boron phosphide. Therefore, the curved shapes which are made from boron phosphide are especially advantageous as combustion chambers and throats in which a rocket fuel, for example, diborane and an oxidizing agent such as fuming nitric acid are comingled in order to provide a controlled combustion which releases a very large amount of energy, such as in the propulsion of a rocket.

Since crystalline boron phosphide is also a very hard material having a hardness of Moh's scale between 8 and 9 (diamond=10), this material is particularly suitable for the manufacture of impellers for fuel pumps in missiles, rockets and space ships and other moving parts.

The high temperature stability of crystalline boron phosphide makes this material particularly valuable in the fabrication of parts for turbines, including both combustion turbines and steam turbines. Specific parts thus contemplated include the nozzles for either a steam or combustion gas stream (the latter possibly including fly ash and metallic particles therein) and also the turbine blades, vanes, and bearings.

The inert character of crystalline boron phosphide in corrosive atmospheres makes this material a valuable source for the manufacture of steam jet ejectors and rupture discs which must maintain their form and strength at a constant value despite exposure to corrosive atmospheres, such as in petroleum refining.

Because of the hardness of crystalline boron phosphide, this material is especially adapted for use as an abrasive material or cutting tool, either in the form of a finely-divided product or in a fabricated form, for example as a cutting tool in a lathe. The particulate form of crystalline boron phosphide may also be used in the manufacture of grinding tools or wheels in which the particles are secured in a resinous binder. The finely-divided form of crystalline boron phosphide, because of its abrasive character, is also suitable for use in the manufacture of sand paper and other abrasive products. In this relationship the crystalline material is secured to a backing of paper, cloth, etc. by the use of a suitable glue, cement or resin. Another application for the crystalline boron phosphide arising from its wear-resistant properties is as wear plates, for example, in grinders and crushers intended for size reduction of minerals, rocks, etc. and in the grinding of pulp wood in the production of paper.

The chemical inertness and high temperature stability of crystalline boron phosphide makes this a valuable material in the fabrication of chemical apparatus, such as crucibles and reactors intended particularly for use at high temperatures, since this material is resistant against temperatures of up to 6,000° F. Agitator arms may also suitably be fabricated from this material and burners such as in the manufacture of acetylene from natural gas, phosphorus pentoxide from phosphorus are typical examples of elements which may be fabricated from the crystalline form of boron phosphide. Such burners may also be made in the form of heat exchangers, since it is well known that burners must operate at very high temperatures because of the radiation effects such as in the combustion of elemental phosphorus to phosphorus pentoxide by air or oxygen.

Another field of application of the crystalline form of boron phosphide is as a nuclear reactor shield in the operation of atomic piles and other reactors in the field of atomic energy.

The crystalline boron phosphide that is made by the process of the present invention is particularly advantageous in the manufacture of semi-conductors.

It has been found that this crystalline material is characterized by a negative temperature coefficient of resistance which makes the material a suitable component in the manufacture of various semi-conductor products particularly for high temperature service. It has been found by optical measurements on cubic crystalline boron phosphide that it has a forbidden energy gap of about 6.8 electron volts. For example, rectifiers, transistors, and other barrier-layer devices may be made from the crystalline boron phosphide, together with other crystalline materials and with the development of suitable controlled impurities if desired, for example, elements of groups II or VI of the periodic table.

The semi-conductor properties of the crystalline form of boron phosphide are also shown by the optical characteristics of this cubic crystalline material. An unusually effective field of utilization therefore is an optical window in test instruments and in guided missiles and space ships. Such a window may also be fabricated with an external boron phosphide protective layer deposited upon a base of quartz or other transmissive material. It has been found that the cubic crystalline form of boron phosphide is characterized by an unexpected transmissive power for radiation of characteristic wave lengths (such as from about 1,850 Angstroms to about 8,000 Angstroms). This permits the fabrication of a window which is to be subjected to high temperature and high pressure conditions, for example as an observation port in a furnace or nuclear reactor or as an observation port for a space ship or missile which is intended to approach quite close to the sun or other stars. In this relationship, it is thus possible to pass the desired characteristic band of radiation through the window of crystalline boron phosphide while at the same time providing for the maintenance of erosion resistance of such a window even when it is subjected to an ambient temperature of 5,000° F. or 6,000° F.

Another field of utilization of crystalline boron phosphide is as a radiation meter. The imposition of certain specific bands of strong radiation upon the cubic crystalline form of boron phosphide results in the characteristic electrical modification of the material which is readily measured by conventional electrical procedures. Thus, it is possible to provide a radiation meter which can withstand extreme conditions of strong radiation, for example in a nuclear reactor, together with high temperature and pressure without failure of the meter element.

Since the cubic crystalline form of boron phosphide may be fabricated in order to achieve both dense (e.g. nearly theoretical density) and porous surfaces, a number of fields of application are based upon this property. For example, the dense form of crystalline boron phosphide may be used to fabricate a solid nose cone of needle form or blunt form intended for a guided missile. This crystalline boron phosphide is highly resistant against heating and thus withstands the attack by erosive gases which a missile nose cone is subjected upon re-entry into the atmosphere. Under such conditions, speeds of up to 25,000 miles per hour may be encountered, together with surface temperatures in the order of 10,000° F. or above, and it is consequently imperative that a thermally stable material be available for this application, even though the extreme conditions may exist for only a short time, such as about 30 seconds.

A number of fabrication methods are available to produce the above-described manufactured products from crystalline boron phosphide. If it is desired to employ the crystalline material in powder form, one of the desirable methods is the hot pressing technique in which the powder is placed in a die of the desired form and subjected to an elevated temperature, for example from 1,000° F. to 6,000° F. for a sufficient time to consolidate the crystalline material and effect sufficient sintering to achieve the desired density. The pressure is generally from about 500 to 20,000 p.s.i. A flux or bonding agent may also be employed in this relationship; suitable materials for this purpose include one or more of the metals: iron, nickel, cobalt, chromium, niobium, tantalum, titanium, zirconium, tungsten, molybdenum and hafnium; and the oxides alumina, zirconia, hafnia, silica, beryllia, titania, thoria, as well as combinations of the oxides and combinations with the said metals. Inorganic compounds having fluxing or bonding properties, such as the borates or phosphates, e.g., the alkali borates and phosphates may also be employed. Boron phosphate may also be employed as a bonding agent which forms a glassy matrix having the property of securing the crystalline particles of boron phosphide. Another additive which may be employed in the pressing operation is asbestos, since it has been found that when the composite article is later subjected to a vacuum heating or oxidizing condition, such as a combustion gas flame at about 6,000° F., the asbestos is burned out or fused, leaving the crystalline boron phosphide which is of utility in the use of sweat or transpiration cooling. This method is employed for cooling missile, rocket or space ship external and internal surfaces which are subjected to high temperatures. The porous objects having a wall of crystalline boron phosphide permit the exudation of a liquid, such as water, alcohol or the liquid fuel through the porous wall so that the liquid, upon passing through the porous boron phosphide is evaporated to provide an unusually efficient cooling effect.

The above-described porous form of fabricated boron phosphide is also of utility as a filter element, particularly for corrosive uses. Thus, in the fuel system for a rocket or missile, it is necessary to filter the fuel and/or oxidizing agent in order to avoid clogging the line. This presents a difficult problem in the case of corrosive agents, such as fuming nitric acid which attacks most metals. However, when a porous boron phosphide filter is inserted in the fuel or oxidant line, this filtering effect is readily accomplished without the danger of corrosion or dissolution of the crystalline boron phosphide.

In the hot pressing operation it may also be desirable to control phase changes of the boron phosphide by the use of specific additives. For example, transition temperature changes may be controlled by the addition of silicon carbide, zinc oxide and other crystalline materials to aid in the pressing operation.

Cold pressing or indenting of the crystalline boron phosphide is another fabrication method which may be employed, particularly with the use of a binder such as sodium silicate for the fabrication of various parts and fittings. The pressure utilized may be up to 200,000 p.s.i. Suitable metallic additives which may be employed, together with the crystalline boron phosphide include iron, nickel, cobalt, chromium, niobium, tantalum, titanium, zirconium, tungsten, molybdenum and hafnium, while refractory and insulating oxides, such as alumina, zirconia, hafnia, silica, beryllia titania, thoria may also be employed singly or in combination, including combinations with the said metals. The cold pressed material is subsequently treated in various ways, such as by sintering, reducing or partially oxidizing the fabricated article, in which case the boron phosphide may also undergo a number of controlled modifications. The use of partial oxidation of the cold pressed material also permits the development of porosity, such as by the employment of additives exemplified by naphthalene and other organic compounds as well as cork and asbestos, since the heating and oxidation results in the burning out or transformation of such binder constituents to a glassy or crystalline matrix, which together with the change in the said metals or oxide constituents serves to secure and bond the boron phosphide particles.

If a minor proportion of elemental boron is employed as an additive with the crystalline boron phosphide in either hot pressing or cold pressing, the fabricated part may be subjected to a phosphorization treatment in which the piece is subjected to the vapor of elemental phosphorus or another phosphorus compound, for example phosphine, in order to consolidate the fabricated part with the transformation of the boron binding agent to boron phosphide.

If it is desired to make use of the cubic crystalline form of boron phosphide as a hardening element in a metallic base, for example, iron in the production of wear plate, the boron phosphide may be produced directly in such a metallic matrix. The base metals which may be employed in this relationship include the group of aluminum, magnesium, copper, titanium, chromium, manganese, vanadium, zirconium, molybdenum, tantalum, thorium, iron, nickel, lead, tin, antimony, bismuth and zinc. Articles of this type are useful to withstand wear and abrasion such as in the manufacture of a chute for a sand or other minerals. Another use for such a reinforced metal is as a baffle in a steam turbine. The above described process for the reaction of a phosphorus source such as ferrophosphorus and a boron source such as ferroboron at elevated temperature results in the production of the desired cubic crystalline form of boron phosphide which is obtained in dispersed form in the iron matrix.

Pack diffusion is another method for applying crystalline boron phosphide to desired metallic or ceramic parts. In this method, particles of the crystalline boron phosphide are packed around the desired metallic or ceramic parts and the entire mixture subjected to a high temperature, e.g., about 1500° F. to 6000° F. for a suitable period of time to enable diffusion of the boron phosphide to take place into the desired parts and fittings.

If it is desired to coat or plate the crystalline boron phosphide on various substrates of metal or refractory parts, particularly when intricate sections are involved, a flame spraying technique is desirable. In this method, a high temperature flame such as a reducing oxy-hydrogen flame is provided with finely-divided particles of crystalline boron phosphide so that the impingement of the flame upon the desired prototype base parts of metal or refractory coats the parts with a uniform and dense deposit of the crystalline boron phosphide.

Another method which may be applied is the deposition of a coating of crystalline boron phosphide by electrophoresis. This method is particularly suited for precision coating of complicated shapes. Metals and oxides selected from the group consisting of iron, nickel, cobalt, chromium, niobium, tantalum, titanium, zirconium, tungsten, molybdenum and hafnium; and the oxides alumina, zirconia, hafnia, silica, beryllia, titania, thoria, as well as combinations of the oxides and combinations with the said metals may also be applied in combination with the crystalline boron phosphide by the electrophoretic method. In this process an aqueous suspension of the crystalline boron phosphide and the desired metal or oxide is prepared, preferably with particle size ranges of from 1 to 10 microns. A suspending or dispersing agent such as carboxymethylcellulose may also be present. The suspension preparation is then deposited upon the prototype of graphite, a metal or a fine screen metal form utilizing a plating voltage of the order of 6 to 100 volts direct current. A uniform coating of the boron phosphide optionally with a metal and oxide therewith of the group set forth above is thus applied to the base prototype. The coating is subsequently air dried and is then treated by a low temperature hydrogen reduction in the case of the metallic oxides. Hydrogen reduction is not necessary with coatings of the metal powders, and the boron phosphide is unaffected by such treatment. The electrophoretic coating is next densified by peening, rolling or by isostatic pressing, the latter method being particularly convenient for small items. A final step after densification is a sintering of the coating to provide a uniform and strong coating which is resistant to chemicals and to abrasion.

A mechanical method of deposition which is available for the fabrication of external layers of crystalline boron phosphide is that of slurry deposition. In this method the finely-divided crystalline boron phosphide is dispersed in a liquid vehicle such as water, optionally with a dispersing or suspending agent such as carboxymethylcellulose. Additive materials, such as metals, for example, iron, nickel, cobalt, chromium, niobium, tantalum, titanium, zirconium, molybdenum and hafnium and finely-divided refractories, e.g., alumina, zirconia, hafnia, silica, beryllia, titania, and thoria may also be present.

The forms upon which the slurry is to be deposited are made with a porous structure, for example, from metal powders which have been loosely consolidated to the desired shape or by the use of a fine mesh screen form having the shape of the desired object. Such a porous prototype is suspended in the liquid vehicle which is then subjected to high pressures of the order of 10,000 to 50,000 pounds per square inch. Provision is made for the liquid vehicle to be removed from the interior of the mold or prototype piece which may have an intricate form, or may consist of a simple flat plate as may be desired. As a result of the imposition of pressure upon the dispersion of the crystalline boron phosphide, the slurry is uniformly pressed against the prototype with the result that an interlocking crystalline structure is obtained without internal voids or bridges. When the desired thickness of crystalline boron phosphide has thus been formed, the coating may be subjected to further mechanical treatment. For example, the coating thus obtained by slurry dispersion may be densified by peening, rolling or isostatic pressing. Finally the deposited coating of crystalline boron phosphide, together with any additives is sintered to consolidate the coating to a dense form.

Another method of fabrication which is of utility in forming bodies from crystalline boron phosphide is the slip casting technique. In this method a slurry is made of the crystalline boron phosphide, together with any desired additive material, such as finely-divided refractories, e.g., alumina, zirconia, hafnia, silica, beryllia, titania, and thoria. This mixture is then used in conventional ceramic slip casting techniques to obtain the desired shapes and fittings in a green form which is then fired, packed or sintered to consolidate the crystalline particles.

What is claimed is:
1. Process for the production of crystalline boron phosphide which comprises contacting a boron source selected from the group consisting of boron halides, boron hydrides and boron alkyls with a phosphorus source selected from the group consisting of phosphorus halides and phosphorus hydrides at a temperature of at least 1,100° F. to obtain crystalline boron phosphide.

2. Process for the production of crystalline boron phosphide which comprises contacting a boron source selected from the group consisting of boron halides, boron hydrides and boron alkyls with a phosphorus source selected from the group consisting of phosphorus halides and phosphorus hydrides at a temperature of at least 1,100° F. to obtain crystalline boron phosphide, and thereafter collecting the said crystalline boron phosphide on a solid surface.

3. Process for the production of crystalline boron phosphide which comprises contacting boron halide with phosphine at a temperature of at least 1,100° F. to obtain crystalline boron phosphide.

4. Process for the preparation of crystalline boron phosphide in a cubic crystalline form which comprises contacting boron trichloride with phosphine at a temperature of from 1,600° F. to 2,700° F.

5. Process for the production of curved shaped objects which comprises contacting an inert prototype of the desired shape with a gaseous mixture of boron trichloride and phosphine at a temperature of from 1,600° F. to 2,700° F. and coating the said prototype with crystalline boron phosphide resulting from the reaction of the said boron trichloride and phosphine.

6. Process for coating a surface with crystalline boron phosphide which comprises contacting the said surface with boron trichloride and phosphine at a temperature of from 1,600° F. to 2,700° F.

References Cited in the file of this patent

UNITED STATES PATENTS

| | | |
|---|---|---|
| 2,467,647 | Alexander | Apr. 19, 1949 |
| 2,759,861 | Collins et al. | Aug. 21, 1956 |
| 2,798,989 | Welker | July 9, 1957 |
| 2,832,672 | Fetterley et al. | Apr. 29, 1958 |